(12) United States Patent
Striegler

(10) Patent No.: US 8,734,935 B2
(45) Date of Patent: May 27, 2014

(54) SCRATCH-RESISTANT SILICONE COATING FOR COOKTOPS MADE OF GLASS OR GLASS CERAMIC

(75) Inventor: Harald Striegler, Ockenheim (DE)

(73) Assignee: Schott AG, Mainz (DE)

( * ) Notice: Subject to any disclaimer, the term of this patent is extended or adjusted under 35 U.S.C. 154(b) by 373 days.

(21) Appl. No.: 12/592,973

(22) Filed: Nov. 20, 2009

(65) Prior Publication Data

US 2010/0167035 A1 Jul. 1, 2010

(30) Foreign Application Priority Data

Nov. 21, 2008 (DE) .......................... 10 2008 058 318

(51) Int. Cl.
*B32B 7/02* (2006.01)
(52) U.S. Cl.
USPC ............................ 428/212; 428/220; 428/324
(58) Field of Classification Search
USPC ......................................... 428/212, 220, 324
See application file for complete search history.

(56) References Cited

U.S. PATENT DOCUMENTS

| 3,742,174 | A | | 6/1973 | Harnden, Jr. | |
|---|---|---|---|---|---|
| 5,747,153 | A | * | 5/1998 | McDaniel | ..................... 428/324 |
| 6,580,058 | B2 | * | 6/2003 | Gratz et al. | .............. 219/448.11 |
| 7,087,862 | B1 | * | 8/2006 | Shaffer et al. | ................. 219/392 |
| 2005/0214521 | A1 | | 9/2005 | Florent et al. | |
| 2008/0264931 | A1 | * | 10/2008 | Vilato et al. | .................. 219/622 |

FOREIGN PATENT DOCUMENTS

| DE | 25 06 931 | | 9/1976 |
|---|---|---|---|
| DE | 35 03 576 | C2 | 8/1986 |
| DE | 196 46 826 | C2 | 8/1997 |
| DE | 197 21 737 | C1 | 11/1998 |
| DE | 10 2005 031 392 | A1 | 1/2007 |
| DE | 10 2005 046 570 | A1 | 4/2007 |
| DE | 10 2006 023 704 | A1 | 11/2007 |
| DE | 10 2006 027 739 | A1 | 12/2007 |
| EP | 1 170 264 | A1 | 1/2002 |
| EP | 1 267 593 | B1 | 12/2002 |
| EP | 1 414 762 | B1 | 5/2004 |
| EP | 1 837 314 | A1 | 9/2007 |
| JP | 10-273342 | | 10/1998 |
| JP | 2001-213642 | | 8/2001 |
| JP | 2001-233636 | | 8/2001 |
| JP | 2001-233637 | | 8/2001 |
| JP | 2003-086337 | | 3/2003 |
| JP | 2004-193050 | | 7/2004 |
| JP | 2005-038622 | | 2/2005 |
| JP | 2005 298266 | | 10/2005 |
| WO | WO 2005/092810 | A2 | 10/2005 |

\* cited by examiner

*Primary Examiner* — Aaron Austin
*Assistant Examiner* — Lawrence Ferguson
(74) *Attorney, Agent, or Firm* — Pauley Petersen & Erickson

(57) ABSTRACT

A functional element, in particular a cooktop or control panel, having a flat substrate composed of or of glass or glass ceramic, in which a coating that contains a crosslinked polysiloxane is applied to the substrate. In order to improve the scratch resistance of such a coating, according to this invention, a covering layer that contains an uncrosslinked polysiloxane is applied to the coating.

42 Claims, 2 Drawing Sheets

SCRATCH-RESISTANT SILICONE COATING FOR COOKTOPS MADE OF GLASS OR GLASS CERAMIC

BACKGROUND OF THE INVENTION

1. Field of the Invention

This invention relates to a functional element, in particular a cooktop or a control panel with a flat substrate of glass or glass ceramic in which a coating that contains a crosslinked polysiloxane is applied to the substrate.

2. Discussion of Related Art

Currently, cooktops can be manufactured in an extremely wide array of colors for a reasonable price if a plate of colorless glass, such as Borofloat®, soda-lime glass, or colorless glass ceramic is used as a substrate, whose underside, the side oriented away from the user, has a colored coating. Silicone-based coating systems have turned out to be particularly advantageous because they achieve the required imperviousness to heat conduction paste and the required color stability when exposed to thermal loading.

German Patent Reference DE 35 03 576 C2, European Patent Reference EP 1 267 593 B1, and Japanese Patent References JP H10-273 342 and JP2005 038 622 mention undercoatings in the form of two-layered systems of a pigmented glass layer serving as a first layer, directly on the underside of the substrate, and a silicone layer serving as a second layer.

Among other things, these systems have a disadvantage, as mentioned in Japanese Patent Reference JP2001 233 636, that the glass layer underneath significantly reduces the substrate strength.

Japanese Patent References JP2001 233 636, JP2001 233 637, JP2001 213 642 and JP2003 086 337 propose using among other things silicone resin as a bonding agent for the first layer, then applying a second layer to it, which is based on glass ceramic, aluminum titanate, or precious metal preparations, and firing both layers simultaneously at a temperature above 800° C. During the firing, the silicon decomposes completely, forming an inorganic silicon oxide network whose bond to the substrate is a weaker than in the above-mentioned glass-based systems so that there is no noticeable reduction in the strength of the substrate.

In order to eliminate the complex firing step, in which the inorganic layers of glass, aluminum titanate, precious metals, or glass ceramic are obtained at high temperatures (700-800° C.), Japanese Patent Reference JP2003 086 337 mentions a system composed of two layers of a heat-resistant resin. In it, the first layer contains effect pigments. So that the effect pigments can produce their iridescent effect, a second layer in which the heat-resistant resin is pigmented black and that serves as an opaque layer, is printed onto the back of the first layer. Both layers are hardened at only 200° C.

Single-layer silicone coating systems used as undercoatings for cooktops are also known.

German Patent Reference DE 25 06 931 C3 discloses a silicone-based enamel that can have aluminum, iron mica, and black pigments. The coating, however, is not used for affecting the color design of cooktops, but rather to increase the thermal conductivity of the cooktop in the infrared-heated heating range.

For undercoating and affecting the color design of cooktops Japanese Patent Reference JP2005 298 266 discloses a single-layer coating with a tri-functional methylphenylpolysiloxane as a bonding agent. The firing of the coating takes place at 200-350° C. The layer thickness is 10 µm and below. Because of the three-dimensional crosslinking of the silicone, the coating is impervious to heat conduction paste.

United States Patent Reference US2005 214 521 A1 describes single-layer silicone coatings for glass, and glass ceramic cooktops that remain color-stable when exposed to thermal loading of up to 700° C. The color stability in the temperature range from 20-700° C., despite the decomposition of silicone starting at 400° C., is supposedly achieved because the silicone resins used are largely free of organic groups.

For the successful use of silicone coatings as color bearing undercoatings of cooktops, in addition to color stability and opacity, properties such as imperviousness to heat conduction paste, adhesion strength, and scratch resistance are also important. In particular, a high level of scratch resistance of the silicone undercoating is a decisive factor in whether or not the cooktop can be transported and installed without being damaged. If the scratch resistance of the silicone coating is high, it is possible to reduce the number of defective plates produced and to simplify the installation of the cooktops. The consequently reduced number of rejects during production and installation makes it possible to achieve considerable cost savings.

Measurements of the scratch resistance of commercially available cooktops with silicone coatings, without the above-mentioned glass, glass ceramic, aluminum titanate, or precious metal layer, have shown that even with a load of 200-300 g, a rounded hard metal spike (radius: 500 µm) penetrates the coating and a scratch is detectable from the point of view of the user. It is immaterial here whether the silicone coating as described above is composed of two layers of a crosslinked silicone resin or of only one layer of an uncrosslinked, crosslinked, or pyrolized silicone resin. The hard metal spike removes the respective coatings down to the substrate with a load of 100 g, but no greater than 300 g.

Measurement of the temperature on the underside of cooktops has shown that with high-quality induction stovetops, but also in specially designed gas cooking appliances, in normal use, temperatures of only 150-250° C. are reached and in the worst-case scenario, an empty pot at maximum heat setting, a temperature of 350° C. is reached. By contrast with stovetops equipped with infrared-radiant heating elements, temperatures of up to greater than 600° C. are reached. The temperature regulation of induction stovetops essentially depends on the effectiveness of the installed electronic switching and regulating circuits and the position of the temperature sensors underneath the cooktop, such as taught by German Patent References DE 10 2005 031 392 A1, DE 10 2006 023 704 A1 and DE 196 46 826 C2. United States Patent Reference U.S. Pat. No. 3,742,174 discusses sophisticated technology that even permits cooktops to be made of plastic.

SUMMARY OF THE INVENTION

One object of this invention is to provide a functional element, in particular a cooktop composed of glass ceramic or glass, equipped with a coating system that: is more scratch-resistant than the commercially available silicone coatings; can be obtained at firing temperatures of less than 500° C.; withstands both short-term temperature loads of 350° C. and long-term temperature loads of 250° C. without changing color; is opaque; is impervious to heat conduction paste and adhesive; has a sufficient adhesion strength; and does not reduce the strength of the substrate.

In very special cases, the coating system should be suitable for capacitive touch switches. Furthermore, in particular cases, it can be advantageous if the coating substance: can be applied in a structured fashion; has a long working time (8 hours and more); and has a high storage stability (no noticeable settling of pigments and fillers).

BRIEF DESCRIPTION OF THE DRAWINGS

This invention is explained in greater detail below in view of an exemplary embodiment shown in the drawings, wherein.

DETAILED DESCRIPTION OF THE INVENTION

Figure 1:
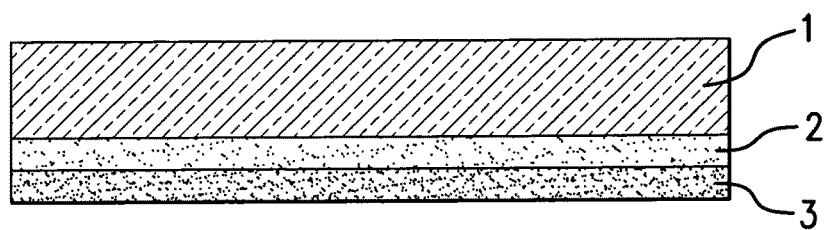
FIG. 1 is a schematic cross-sectional side view showing a coating on a substrate and a covering layer over or covering the coating, according to one embodiment of this invention.

The above object and others of this invention are attained if the coating has a covering layer applied to it, which has a crosslinked polysiloxane.

Consequently, a silicone coating system is used, which is of or is composed of two layers and whose coating is formed as a first color-bearing layer directly against the underside of the substrate and composed of a crosslinked polysiloxane, pigments, and optionally, platelet-shaped fillers and whose covering layer, as a second layer, is composed of an uncrosslinked polysiloxane that can also contain talcum or another layered silicate.

The individual layers of the coating system can be applied one after the other to the substrate composed of glass or glass ceramic by screen printing or also using other methods such as spraying, pad printing, or stamping. In this case, the coating or first layer is fired at 200-500° C. in order to crosslink the film-forming silicone resin before application of the covering layer or second layer, which is then dried at only 20-180° C. The layer thickness of each layer is typically 10-50 μm, in particular 15-30 μm. The total thickness of the two-layer system should be at least 20 μm so as to achieve a scratch resistance of 500 g. The layer thickness is usually 25-65 μm, ideally 30-50 μm, in order to achieve even higher levels of scratch resistance.

Such a layer system prevents a hard metal spike (radius 500 μm) from penetrating to the substrate, even under a load of 500-1000 g. The outstanding scratch resistance is based on the combination of a hard first layer, such as a crosslinked polysiloxane, directly on the substrate, with a soft, wax-like second layer over it serving as a covering layer. The hard metal spike or another scratching, scraping object can in fact penetrate the outer covering layer in such a system, but then merely slides across the crosslink-hardened color-bearing or first layer, even when considerable pressure is exerted on it, due to the fact that the covering layer is composed of wax-like silicone and optionally also layered silicates.

The composition of the color-bearing layer will be described first.

To produce a color-bearing layer, suitable substances for the silicone resin for the coating include solid or fluid polysiloxanes with methyl or phenyl groups as organic radicals and hydroxy, alkoxy, or vinyl radicals as functional groups, by which the thermal crosslinking occurs through firing at temperatures greater than 180° C. The percentage of functional groups should be 1-10 wt. % and the molecular weight should be 1000-6000 g/mol. Particularly color-stable coatings are produced using hydroxy-functional phenylpolysiloxanes with a percentage of 2-5 wt. % hydroxy groups and a molecular weight of 1500-2000 g/mol. The percentage of the silicone resin in the fired coating should be 40-70 wt. %, particularly preferably 50-60 wt. %.

In order to achieve color stability at up to 250° C. and at short-term temperatures of up to 350° C., it is necessary to use high-quality inorganic colored pigments in the color-bearing coating. In the case of cooktop coatings, the pigments must not contain lead, hexavalent chromium ($Cr^{+VI}$), or cadmium, in accordance with legal regulations governing electrical and electronic appliances. Suitable inorganic colored pigments and black pigments include iron oxide pigments, chromium oxide pigments, or oxidic mixed-phase pigments with rutile or spinel structures, and inorganic white pigments (oxides, carbonates, sulfides). Pigment carbon black is not suitable because it gradually decomposes with thermal loading at temperatures above 300° C. Examples of suitable pigments include the iron oxide red pigments composed of hematite ($\alpha$-$Fe_2O_3$), iron oxide black pigments with the approximate composition $Fe_3O_4$, and the mixed-phase pigments cobalt blue $CoAlO_4$, zinc iron brown $(Zn,Fe)FeO_4$, chrome iron brown $(Fe,Cr)_2O_4$, iron manganese black $(Fe,Mn)(Fe,Mn)_2O_4$, spinel black $Cu(Cr,Fe)_2O_4$, and the white pigments $TiO_2$ and $ZrO_2$.

In order to achieve special color bearing effects, it is also possible to use inorganic luster pigments, such as metal effect pigments, pearlescent pigments, and interference pigments.

In addition, most platelet-shaped pigments increase the mechanical strength of the color-bearing layer. Platelet-shaped particles composed of aluminum-, copper-, or copper-zinc alloys are suitable for use as metal effect pigments, particularly if they are coated, for example, with silicon oxide to increase color stability under thermal loading. It is possible to use floating types, such as leafing pigments, to increase the imperviousness of the layer to water, oil, adhesive, and other fluids. For example, micas that are coated with $TiO_2$, $SiO_2$, or $Fe_2O_3$ are suitable for use as pearlescent pigments and interference pigments.

The particle diameter of the pigments should be less than 20 μm (preferably less than 10 μm), platelet-shaped pigments should have edge lengths of less than 100 μm (preferably less than 75 μm) so that the pigment paste can be printed with no trouble using conventional screen mesh widths (54-64 corresponding to a mesh width of 115 μm or 100-40 corresponding to a mesh width of 57 μm). The pigment percentage in the fired coating should be 20-40 wt. %, particularly preferably 24-36 wt. %, so that a sufficiently opaque coating can be achieved with the layer thicknesses mentioned above.

As mentioned above, platelet-shaped pigments increase the mechanical strength of the coating, for example they prevent cracks from forming in the layer or prevent the layer from peeling off in the worst-case scenario. The same effect can also be achieved through the addition of non-coloring, platelet-shaped fillers, such as through the addition of layered silicates such as mica, kaolin, or talcum. The percentage of platelet-shaped fillers in the fired coating can be 0-30 wt. %. It is possible to select lower percentages (0-15 wt. %) if the coating already contains platelet-shaped pigments. Particularly when glass ceramic is used as the substrate, the silicone layer should be mechanically reinforced so that a sufficient adhesive strength is achieved.

In order to obtain a pigment paste that is suitable for use in screen printing from the combination of silicone resin, pigments, and fillers, it is necessary to also add a solvent in which the silicone resin can be dissolved and in which the pigments and fillers can be dispersed. Depending on the silicone resin, it is suitable to use aliphatic or aromatic hydrocarbons; among hydroxy-functional phenylsiloxanes, esters have proven effective. Especially for screen printing applications, high-boiling solvents, such as evaporation number >35, should be used so that evaporation of the solvent does not cause the pigment to already solidify while still in the screen. Suitable solvents include, for example, methoxypropanol, 2-butoxyethyl acetate, monobutyl ether acetate, or diethylene glycol monobutyl ether. Thus, it is possible to achieve working times of more than 8 hours.

In order to optimize the crosslinking of the glass or glass ceramic substrate, it is possible to add antifoaming agents, crosslinking agents, and flow-control agents to the pigment paste. The settling of pigments and fillers during storage can be counteracted through the addition of thickening agents, such as cellulose derivatives, polyacrylates, polyether polyols, xanthan, or thixotropic agents, such as layered silicates, pyrogenic silicic acid, bentonites. The addition, however, should be limited to low weight percentages (1-5 wt. %) so as not to negatively influence other properties such as the adhesion strength. For screen printing, the viscosity of the silicone pigment should be in the range from 1000-3000 mPa·s, preferably 2000-2500 mPa·s ($23°$ C., shear rate 200 s$^{-1}$).

The above-described pigment paste is applied to the entire surface of the glass or glass ceramic, such as by screen printing with a mesh fineness of 54-64. The color-bearing first layer or coating can, however, also be partially omitted, such as in the vicinity of display units and other functional regions or in order to produce color contrasts through combination with the covering layer. In the display region (or other regions, e.g. to mark the cooking zones), the glass or glass ceramic substrate can also have another coating, for example composed of a precious metal coating as described in German Patent References DE 10 2006 027 739 or DE 10 2005 046 570.

The screen mesh width should be 54-64 so that the first pigment layer is sufficiently thick and therefore opaque. With particularly high-filled enamels, however, it is also possible to use finer meshes, such as 100-40 or 140-31, as long as the resulting pigment layer remains opaque.

After the pigment is applied to the substrate, the coating must be fired.

In order to facilitate the handling of the coated glass or glass ceramic plates and to avoid damage to the freshly printed first pigment layer when placing the coated plates into the firing furnace, it is advisable to use a solid resin as the silicone resin, with a melting or softening point above 40° C., in particular above 60° C., and to dry the pigment before firing, for example for about 1-60 min. at 20-180° C. The scratch resistance of the first pigment layer is low and at this stage is only approx. 100-200 g, for example.

In the subsequent firing at 200-500° C., such as for 1-24 h, preferably 1-4 h, the silicone resin crosslinks through the splitting-off of functional groups, such as hydroxy groups, methoxy groups and the like, and forms a three-dimensional network structure, chiefly by Si—O bonds. The firing increases the mechanical resistance of the coating and it becomes harder and is more difficult to scratch. The scratch resistance of the fired coating is 200-300 g. In addition, because of the chemical conversion of the silicone resin, the pigment tone of the coating changes slightly so that the color-bearing layer takes on its final hue after the firing.

At very high temperatures, starting at approx. 400° C., the silicone resin begins to pyrolize, for example decomposes through the splitting-off of organic radicals, such as phenyl and methyl radicals, which can cause the porosity of the coating to increase significantly depending on the degree of pyrolysis. As a rule, the decomposition products cause the coating to turn brown.

The pyrolytic decomposition of the silicone resin during firing is thus normally not desirable. However, the partial pyrolysis of the color-bearing silicone layer, such as 10 min to 5 h of firing at 400-500° C., depending on the silicone resin, can forestall potential color changes in subsequent use so that by virtue of its increased color stability, the partially pyrolized layer outperforms layers that only contain crosslinked silicone resin, for example fired for 1-24 h at 200-350° C.

According to this invention, another layer composed of or of a silicone resin layer is applied to the color-bearing layer. In order for the coating system to be sufficiently color-stable in subsequent use, the color-bearing layer or coating must be opaque and cannot be completely permeated by the covering layer, such as a second silicone layer. The opacity and barrier effect in relation to the covering layer are assured by the layer thickness, the above-mentioned pigment percentage, optionally the percentage of platelet-shaped components in the coating, such as a first pigment layer, and/or the crosslinking of the silicone resin at 200-350° C., even with a low degree of pyrolysis, such as a max. 5 h at 400-500° C. If the first layer were not opaque or if, due to a high porosity, it were permeated by the second layer, then during use of the cooktop, a color change would occur that would be visible to the user. This happens because at the temperatures that occur during use of a cooktop, such as 250° C., with short-term occurrences of 350° C., the covering layer gradually crosslinks and thus changes slightly in color.

At this point, it should be noted that in the regions of the cooktop that are heated to temperatures above 250° C. during use, the scratch resistance of the coating system decreases gradually because the silicone resin in the covering layer gradually becomes crosslinked. The reduction in scratch resistance in this case, however, is not disadvantageous because the scratch resistance is mainly required during transport and installation.

During operation of the stovetop, the abrasion resistance, such as the resistance to scouring effects, plays a more important role. Scouring can, for example, reach the mica platelets that are applied between the underside of the cooktop and the induction coils in order to thermally insulate the coils or can reach the thermal sensors that are provided on the underside of the cooktop for temperature control purposes. With both uncrosslinked and crosslinked silicone resin in the covering layer, a sufficient abrasion resistance is present in any case due to the layer thickness of at least 20 μm.

The composition of the covering layer is described in the following specification.

Suitable resins for use as the silicone resin for the covering layer include, among others, the same film-forming agents as are used for the color-bearing layer, such as methyl- or phenylpolysiloxanes with hydroxy, alkoxy, or vinyl radicals as functional groups, as long as they are resins that are solid at 20-40° C. For solid resins their softening or melting point should be greater than 40° C., in particular greater than 60° C. This assures that after drying, the covering layer is solid and not fluid. Because the covering layer is not crosslinked during the production process, it is suitable to use a solid resin to permit handling of the pigment-coated plates. The covering layer does not have to contain any pigment if it has no color-bearing function to perform.

The covering layer can contain talcum, kaolin, or another layered silicate, such as mica. The layered silicate in the covering layer increases the scratch resistance of the layer system further because the covering layer, in addition to the wax-like, uncrosslinked silicone resin, then also contains a slippery filler. The combination of the hard, color-bearing layer with the wax-like covering layer produces a layer system that features a high level of scratch resistance because hard objects, after penetrating into the covering layer, due to the wax-like consistency of the latter, slide across the underlying color-bearing layer without penetrating it. Hard objects that come into contact with the cooktop coating during production, transport, or installation are thus unable to penetrate the layer system or can only do so when subjected to a significantly higher load.

Another function of the layered silicate is to mechanically reinforce the covering layer, which through the use of the cooktop, gradually hardens in the heated region because the silicone resin crosslinks at the utilization temperatures. This is because in the crosslinked, brittle state, the pure silicone resin, particularly if it is a phenylsiloxane, could flake off from the color-bearing layer as a result of powerful thermal expansion. The need to add layered silicates must be experimentally determined for each resin type.

The maximum size of the layered silicate particles should be 10-30 μm. The average particle size should be 1-20 μm. Fine talcum types with a maximum particle size of 15 μm (D98) and an average particle size of 1-10 μm (D50) are ideal. The percentage of layered silicates, in particular talcum, in the dry state can be a maximum of 50 wt. %, in particular 10-25 wt. %. Aside from layered silicates, it is also possible to add other solid lubricants such as graphite or boron nitride in order to increase the scratch resistance.

The above-mentioned substances can be used as solvents. In addition, the process and the storage stability can be optimized by using additives, such as crosslinking agents, dispersion agents, thixotropic agents, and the like. For screen printing, the viscosity of a silicone pigment should be in the range from 1000-3000 mPa·s, preferably 2000-2500 mPa·s (23° C., shear rate 200 s$^{-1}$).

In special cases, the composition of the covering layer can be identical to the composition of the coating or color-bearing layer. The primary advantages of this embodiment are logistical and production-related. It is only necessary to store one pigment and there is no possibility of mistaking one pigment for another during production.

Waxes, such as paraffin, carnauba wax, polyethylenes, as film-forming agents for the covering layer would likewise increase the scratch resistance, but are unsuitable because they do not achieve the thermal stability of polysiloxanes. The decomposition of waxes occurs starting at 150° C. and generates large amounts of smoke.

If the undercoated cooktop is to be suitable for capacitively operating touch switches, such as touch-control units from the company E.G.O., the two-layer silicone layer system must be electrically nonconductive, such as the electrical sheet resistance of the undercoating must be in the megaohm range or better still, in the gigaohm range, greater than $10^9$ Ω/square. This property is achieved by not using electrically conductive pigments, such as metal powder, aluminum flakes, or fillers, such as graphite, in the color-bearing layer or in the covering layer or by at least limiting the percentage of electrically conductive substances in the coating to a quantity low enough to assure a sufficiently high sheet resistance. When aluminum flakes or other electrically conductive pigments are used, the electrical conductivity of the coating can also be inhibited by surrounding the pigments with an electrically nonconductive layer, such as silicone oxide-coated aluminum flakes.

The covering layer can be applied using the same process as the color-bearing layer, such as with screen printing, spraying, pad printing, or stamping. In screen printing, which is preferable because of the possibility it affords to apply structures in a simple way, mesh finenesses of 54-64 and 100-40 have proven effective.

Suitable substrate materials for the coating system include, for example, glass ceramics of the $Li_2O$—$Al_2O$—$SiO_2$ type, in particular colorless glass ceramics with a thermal expansion of $-10\cdot10^{-7}$ K$^{-1}$ to $+30\cdot10^{-7}$ K$^{-1}$ in the temperature range from 30 to 500° C., whose known composition, among other things, is indicated in Table 1 below.

TABLE 1

Composition of suitable glass ceramic substrates

| element oxide | glass ceramic composition (wt. %) | | |
|---|---|---|---|
| $SiO_2$ | 66-70 | 50-80 | 55-69 |
| $Al_2O_3$ | >19.8-23 | 12-30 | 19-25 |
| $Li_2O$ | 3-4 | 1-6 | 3-4.5 |
| MgO | 0-1.5 | 0-5 | 0-2.0 |
| ZnO | 1-2.2 | 0-5 | 0-2.5 |
| BaO | 0-2.5 | 0-8 | 0-2.5 |
| $Na_2O$ | 0-1 | 0-5 | 0-1.5 |
| $K_2O$ | 0-0.6 | 0-5 | 0-1.5 |
| $TiO_2$ | 2-3 | 0-8 | 1-3 |
| $ZrO_2$ | 0.5-2 | 0-7 | 1-2.5 |
| $P_2O_5$ | 0-1 | 0-7 | — |
| $Sb_2O_3$ | usual quantities | 0-4 | usual quantities |
| $As_2O_3$ | usual quantities | 0-2 | usual quantities |
| CaO | 0-0.5 | 0 | 0-1.5 |
| SrO | 0-1 | 0 | 0-1.5 |
| $Nd_2O_3$ | — | — | 0.004-0.4 |
| $B_2O_3$ | — | — | 0-1 |
| $SnO_2$ | — | — | 0-0.4 |
| Source | EP 1 170 264 B1 claims 14-18 | JP (A) 2004-193050 | EP 1 837 314 A1 |

Other suitable compounds include rolled or floated glass plates made of aluminosilicate glass, soda-lime glass, borosilicate glass, or alkaline-earth silicate glass, particularly if the plates are chemically or thermally pretempered, such as described in European Patent Reference EP 1 414 762 B1.

In addition to being used for cooktops, the coating system according to this invention is also suitable for use in control panels or other applications, in which glass or glass ceramic plates are subjected to thermal loading.

EXEMPLARY EMBODIMENTS

Example 1

Scratch-Resistant, Light Gray Silicone Coating with Metallic Effect

A colorless glass ceramic plate, approximately 60 cm wide, 80 cm long, and 4 mm thick, smooth on both sides and with the composition according to European Patent Reference EP 1 837 314 A1 (Table 1, right column), was coated on top with a ceramic decorative pigment according to German Patent Reference DE 197 21 737 C1 in a pattern of dots and was then ceramified.

Then a silicone pigment with the composition (A) according to Table 2 was applied by screen printing, with a screen mesh 54-64, to the entire surface of the underside of the ceramified glass ceramic plate. The viscosity of the silicone pigment was 2100 mPa·s (23° C., shear rate 200 s$^{-1}$).

TABLE 2

Pigment compositions

| pigment components | composition in wt. % | | |
|---|---|---|---|
| | A (light gray) | B (dark gray) | C (black) |
| phenypolysiloxane SILRES IC 836*[1] (Wacker) | 36.9% | 41.5% | 42.0% |
| Bayferrox 303 T (Bayer) | 12.5% | 16.9% | 20.0% |
| Aluminum Powder Special PCR 501 (Eckart-Werke) | 12.5% | 6.6% | 0.0% |
| Finntalc M05N (D50 = 6.8 µm) (Mondo Minerals) | 8.3% | 8.7% | 0.0% |
| MicroTalc AT EXTRA (D50 = 2.5 µm) (Mondo Minerals) | 0.0% | 0.0% | 20% |
| Mittel S (Schwegmann) | 0.5% | 0.5% | 0.5% |
| monobutyl ether acetate (Merck) | 29.3% | 25.8% | 17.5% |

*[1] average molecular weight: approx. 1700 g/mol; hydroxy groups: 3-4.5 wt. %

The coating was dried for 1 h at 150° C. and then fired for 4 h at 450° C., heating and cooling occurred at 3 K/min. Another layer of recipe (A) was printed onto the entire surface of the fired coating, with a screen mesh 54-64, and dried for 1 h at 150° C.

Figure 2:
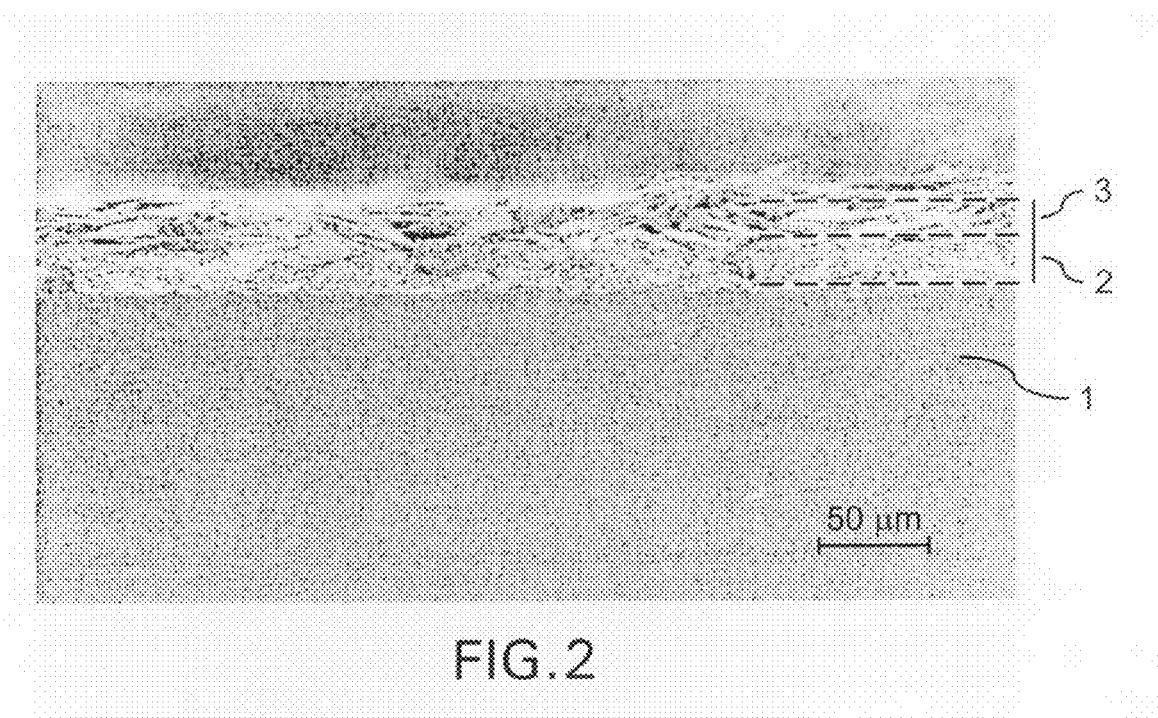
FIG. 2 is an electron microscope image that shows a cross-section taken through a layer system on a glass ceramic substrate, according to one embodiment of this invention.

The layer thickness of the two-layer system was 40-45 µm. FIG. 2, an electron microscope image, shows a cross section taken through the layer system on the glass ceramic substrate. The two layers are clearly visible due to the different densifications produced by the firing and drying.

The system printed onto the underside had an extremely high scratch resistance. The rounded hard metal spike (radius: 500 µm) was not able to penetrate the system, even at a load of 1000 g. No damage was visible when the tested cooktop was viewed from above, from the point of view of the user.

The measurement of the scratch resistance was carried out by placing the hard metal spike, loaded with the respective weight (100 g, 200 g, . . . , 1000 g), onto the coating and moving it approx. 30 cm across the coating at a speed of 20-30 cm/s.

The evaluation of the opacity was carried out with practice-relevant lighting on the glass ceramic cooktop, which was installed on a stovetop. Because it was not possible to see through the installed cooktop into the interior of the stovetop, even when observed from an extremely close distance (10 cm), the undercoating is opaque. The spectral transmission for the undercoated glass ceramic lies in the visible range at $T_{vis} \leq 1\%$, determined according to DIN EN 410 with light type D65.

The resistance to cooking oil, heat conduction paste, and adhesive was tested by applying a drop of these substances to the coating system, approximately 0.1 g distributed over 9 cm$^2$, and assessing the color change after 24 h at 20° C. and after 1 h of firing at 350° C. Because no color change was visible from the point of view of the user in both cases, the coating system is color-stable in relation to the substances.

The temperature resistance was also tested by heating the coated glass ceramic cooktop for 80 h at 350° C. and then testing the color change and the bending strength of the coated glass ceramic as well as the adhesion strength of the undercoating.

The color values before and after the thermal treatment are listed in Table 3. They were measured with a spectral photometer (Mercury 2000, Datacolor) from the point of view of the user, such as through the substrate (light type: D65, observation angle: 10°). The color values are expressed in accordance with the CIELAB system (DIN 5033, part 3 "Color Measurement Numbers"). The color difference according to DIN 6174 was only ΔE=0.6. No color difference was detectable when tested with the normal-sighted eye.

TABLE 3

"Light gray" color values before and after thermal loading

| | color values | | | |
|---|---|---|---|---|
| sample state | L* | a* | b* | color difference ΔE |
| supply state | 59.2 | −0.54 | 3.17 | — |
| after 300 h at 200° C. | 58.7 | −0.50 | 3.53 | 0.6 (undetectable) |
| after 80 h at 350° C. | 58.8 | −0.33 | 3.57 | |
| after 10 h at 450° C. | 58.1 | −0.19 | 4.21 | 1.6 (yellow coloration) |
| after 4 h at 500° C. | 58.5 | −0.20 | 5.20 | 2.2 (brown coloration) |
| after 4 h at 550° C. | 58.2 | −0.10 | 5.40 | 2.5 (brown coloration) |

With a more powerful thermal loading, such as 1 h at 450° C., a slight lightening of the coating occurs, which is only detectable to the normal-sighted eye from a certain observation angle under certain lighting conditions, particularly easy to detect in direct sunlight, at an observation angle of approx. 30°, viewed from the direction of the incident rays of sunlight. The color change of the coating increases with longer-lasting thermal loading and higher temperatures. Thus, for example with a loading of 10 h at 450° C., a color change (yellow coloration) was produced that is easily visible to the normal-sighted eye. After a loading of this kind, the color difference was ΔE=1.6 (DIN 6174). The silicone system is thus not suitable for cooktops that heat to temperatures greater than 350° C. on the underside.

At 175 MPa, the bending strength of the glass ceramic cooktop before and after the thermal loading was at the usual level of greater than 110 Mpa, an average determined in accordance with DIN EN 1288-5. No increase in the strength due to the silicone layer was observed.

The adhesion strength was also sufficient after the thermal loading. It was tested using the "Tesa test" in which a strip of transparent adhesive film was rubbed onto the undercoating and then abruptly torn off (Tesafilm type 104, Beiersdorf AG). A few particles from the covering layer did in fact remain stuck to the adhesive film, but the color-bearing layer did not detach from the substrate. As a result, when the cooktop was observed from the point of view of the user, no damage was detectable and the adhesion strength was found to be entirely sufficient.

The coating system is also suitable for capacitive touch switches because high-quality coated aluminum pigments were used. The function of capacitive touch sensors in the vicinity of the gray silicone coating was tested with a touch-control unit from the company E.G.O. The cooking zones could be actuated with no trouble using the touch switches. This is because the electrical sheet resistance was greater than 20 GΩ/square.

Using an ohmmeter, the sheet resistance can be determined with relative ease by placing the two electrodes of the measuring device onto the coating, as close to each other as possible, approximately 0.5-1 mm apart. The resistance displayed by the measuring device corresponds approximately to the sheet resistance of the coating.

Example 2

Scratch-Resistant Dark Gray Silicone Coating

In the same way as in example 1, a glass ceramic plate was coated with recipe (B) (Table 2), such as first a pigment layer of the dark gray recipe (B) was printed onto the substrate, dried, and fired (4 h at 450° C.) and then another layer of recipe (B) was applied as a covering layer, which was only dried (1 h at 150° C.). This produced a dark gray cooktop with a metallic effect.

The layer thickness of the two-layer system was 32-37 μm and the scratch resistance was greater than 1000 g. The system is opaque. Cooking oil, heat conduction paste, or adhesive do not penetrate it and there was no color change detectable from the point of view of the user.

The system is color-stable at a thermal load of up to 350° C.: after a loading of 80 h at 350° C., no color difference was detectable to the normal-sighted eye. The color difference according to DIN 6174 was only ΔE=0.2.

TABLE 4

"Dark gray" color values before and after thermal loading

| sample state | color values | | |
|---|---|---|---|
| | L* | a* | b* |
| supply state | 45.1 | −0.1 | 2.3 |
| after 80 h at 350° C. | 45.2 | 0.0 | 2.4 |

At 176-187 MPa, the bending strength of the dark gray-coated glass ceramic cooktop before and after the thermal loading was at the usual level of greater than 110 MPa (average determined in accordance with DIN EN 1288-5).

The adhesive strength was also sufficient, comparable to the "light gray" system. The system is suitable for capacitive touch switches because its sheet resistance is greater than 20 GΩ/square.

Example 3

Scratch-Resistant Light Gray Silicone Coating with Black Covering Layer

In the same way as in example 1, a glass ceramic plate was first coated with recipe (A) (Table 2), such as first a pigment layer of the light gray recipe (A) was printed onto the substrate, dried, and fired (4 h at 450° C.) and then a layer of the black recipe (C) was applied as a covering layer, which was only dried (1 h at 150° C.). This produced a light gray cooktop with a metallic effect, viewed from the point of view of the user.

The layer thickness of the two-layer system was 42-47 μm and the scratch resistance was greater than 1000 g. The system is opaque. Cooking oil, heat conduction paste, or adhesive do not penetrate it and there was no color change detectable from the point of view of the user.

The system is color-stable at a thermal load of up to 350° C. After a loading of 80 h at 350° C., no color difference was detectable to the normal-sighted eye. The color difference according to DIN 6174 was only ΔE=0.4.

TABLE 5

"Light gray + black" color values before and after thermal loading

| sample state | color values | | |
|---|---|---|---|
| | L* | a* | b* |
| supply state | 58.8 | −0.54 | 3.24 |
| after 80 h at 350° C. | 59.1 | −0.37 | 3.46 |

At 173 MPa, the bending strength of the coated glass ceramic cooktop before and after the thermal loading was at the usual level of greater than 110 MPa (average determined in accordance with DIN EN 1288-5).

The adhesive strength was still sufficient because from the point of view of the user, no change in the color-bearing layer was detectable in the tested region. The adhesive strength, however, was lower after thermal loading (80 h at 350° C.) than in the two other systems from examples 1 and 2 because after the thermal loading, it was possible to detach the covering layer almost completely in the Tesa test.

The system is suitable for capacitive touch switches because its sheet resistance is greater than 20 GΩ/square.

Counter-Example 1

Single-Layer Light Gray Silicone Coating with Low Scratch Resistance

A colorless glass ceramic plate, approximately 60 cm wide, 80 cm long, and 4 mm thick, smooth on both sides and with the composition according to European Patent Reference EP 1 837 314 A1 (Table 1, right column), was coated on top with a ceramic decorative pigment according to German Patent Reference DE 197 21 737 C1 in a pattern of dots and was then ceramified.

Then a silicone pigment with the composition (A) according to Table 2 was printed onto the entire surface of the underside of the ceramified glass ceramic plate by screen printing (screen mesh 54-64). The coating was dried for 45 min at 150° C.

This produced a light gray glass ceramic cooktop with a metallic effect. The layer thickness of the silicone coating was 20±2 μm. The scratch resistance of the silicone layer applied to the underside was very low. The rounded hard metal spike (radius: 500 μm) was able to completely penetrate the layer system already at a load of 200 g so that the scratch trajectory was clearly visible to the user when viewing the cooktop from above.

Counter-Example 2

Single-Layer Dark Gray Silicone Coating with Low Scratch Resistance

As in counter-example 1, a colorless glass ceramic plate smooth on both sides was coated on the underside with a silicone pigment having the composition (B) according to Table 2. The coating was dried for 45 min at 150° C.

This produced a dark gray glass ceramic cooktop with a metallic effect. The layer thickness of the silicone coating was 20±2 μm. The scratch resistance of the silicone layer applied to the underside was very low. The rounded hard metal spike (radius: 500 μm) was able to completely penetrate the layer system already at a load of 200 g so that the scratch trajectory was clearly visible to the user when viewing the cooktop from above.

Counter-Example 3

Single-Layer Crosslinked Silicone Coating with Low Scratch Resistance

As in counter-example 2, a colorless glass ceramic plate smooth on both sides was coated on the underside with a silicone pigment having the composition (B) according to Table 2. The coating was dried for 45 min at 150° C. and then fired for 4 h at 450° C.

This produced a dark gray glass ceramic cooktop with a metallic effect. The layer thickness of the silicone coating was 19±2 μm. The scratch resistance of the silicone layer applied to the underside was very low. The rounded hard metal spike (radius: 500 μm) was able to completely penetrate the layer system already at a load of 100 g so that the scratch trajectory was clearly visible to the user (viewing the cooktop from above).

Counter-Example 4

Two-Layer Dark Gray Silicone Coating with Low Scratch Resistance

As in counter-example 2, a colorless glass ceramic plate smooth on both sides was coated on the underside with a silicone pigment having the composition (B) according to Table 2. The coating was dried for 45 min at 150° C. and then fired for 4 h at 450° C.

Then an additional layer according to recipe (B) was printed onto the entire surface of the fired coating (screen mesh 54-64), likewise dried for 45 min at 150° C., and then fired for 4 h at 450° C. The layer thickness of the system composed of the two hardened (crosslinked) silicone layers was 32-37 μm.

The scratch resistance of this system was extremely low. The rounded hard metal spike (radius: 500 μm) was able to completely penetrate the layer system already at a load of 200 g so that the scratch trajectory was clearly visible when the tested cooktop was viewed from above from the point of view of the user.

The drawing schematically depicts a side view of an exemplary embodiment of this invention. As shown in the depiction of FIG. 1, a coating 2 composed of or of crosslinked polysiloxane is applied directly to the underside of a substrate 1 composed of or of glass or glass ceramic. The coating 2 is covered with a covering layer 3 composed of or of uncrosslinked polysiloxane.

German Patent Reference 10 2008 058 318.9, filed 21 Nov. 2008, the priority document corresponding to this invention, to which a foreign priority benefit is claimed under Title 35, United States Code, Section 119, and its entire teachings are incorporated, by reference, into this specification.

What is claimed is:

1. A functional element, in particular a cooktop or a control panel, having a flat substrate (1) of a glass or a glass ceramic, a coating (2) containing a crosslinked polysiloxane applied to the substrate (1), and a covering layer (3) of an uncrosslinked polysiloxane applied over the coating (2), wherein the covering layer contains a silicone resin in a form of polysiloxanes with methyl or phenyl groups as organic radicals and hydroxy, alkoxy, or vinyl radicals as functional groups.

2. The functional element as recited in claim 1, wherein a layer thickness of the coating (2) and/or the covering layer (3) lies in a range from 10 to 50 μm.

3. The functional element as recited in claim 2, wherein the layer thickness of the coating (2) and/or the covering layer (3) lies in a second range from 15 to 30 μm.

4. The functional element as recited in claim 3, wherein the total layer thickness, comprising a sum of the layer thickness of the coating (2) and the covering layer (3), is at least 20 μm.

5. The functional element as recited in claim 4, wherein the total layer thickness is in a thickness range from 25 to 65 μm.

6. The functional element as recited in claim 5, wherein a coating material for the coating (2) contains a silicone resin in a form of solid or fluid polysiloxanes with methyl or phenyl groups as organic radicals and hydroxy, alkoxy, or vinyl radicals as functional groups.

7. The functional element as recited in claim 6, wherein a percentage of the silicone resin in the crosslinked coating is in a range from 40 to 70 wt.

8. The functional element as recited in claim 7, wherein the coating (2) contains inorganic colored pigments, white pigments, and/or black pigments.

9. The functional element as recited in claim 8, wherein the coating contains inorganic luster pigments.

10. The functional element as recited in claim 9, wherein the inorganic luster pigments are coated and/or uncoated platelet-shaped pigment parts.

11. The functional element as recited in claim 10, wherein the inorganic colored pigments, black pigments, and/or white pigments have a particle diameter of less than 20 μm.

12. The functional element as recited in claim 10, wherein when platelet-shaped luster pigments are used, they have an edge length of ≤100 μm, preferably ≤75 μm.

13. The functional element as recited in claim 12, wherein the percentage of colored pigments and/or black pigments and/or white pigments in the crosslinked coating (2) is in a range from 20 to 40 wt. %.

14. The functional element as recited in claim 13, wherein a percentage of fillers in the crosslinked coating (2) lies in the range from >0 to 15 wt. %.

15. The functional element as recited in claim 13, further comprising layered silicate particles as a filler, wherein a maximum size of the layered silicate particles is in a range from 10 to 30 μm and an average particle size is 1 to 20 μm.

16. The functional element as recited in claim 15, wherein the percentage of layer silicates in the covering layer (3) is ≤50 wt. %, preferably from 10 to 25 wt. %.

17. The functional element as recited in claim 16, wherein the softening point or the melting point of the material of the coating (2) is ≥40° C.

18. The functional element as recited in claim 17, wherein the covering layer (3) contains a solid lubricant including a graphite and/or a boron nitride.

19. The functional element as recited in claim 18, wherein the coating (2) and the covering layer (3) are produced from the same coating material.

20. The functional element as recited in claim 19, wherein the coating system is of the coating (2) and the covering layer (3) has a sheet resistance of $\geq 10^9$ Ω/cm$^2$.

21. The functional element as recited in claim 1, wherein a total layer thickness, comprising a sum of the layer thickness of the coating (2) and the covering layer (3), is at least 20 μm.

22. The functional element as recited in claim 1, wherein a coating material for the coating (2) contains a silicone resin in a form of solid or fluid polysiloxanes with methyl or phenyl groups as organic radicals and hydroxy, alkoxy, or vinyl radicals as functional groups.

23. The functional element as recited in claim 6, wherein the coating material for the coating (2) contains hydroxy-functional phenylpolysiloxanes with a percentage of 2 to 5 wt. % hydroxy groups and a molecular weight of 1500 to 2000 g/mol.

24. The functional element as recited in claim 1, wherein a percentage of the silicone resin in the crosslinked coating is in a range from 50 to 60 wt. %.

25. The functional element as recited in claim 1, wherein the coating (2) contains inorganic colored pigments, white pigments, and/or black pigments.

26. The functional element as recited in claim 1, wherein the coating contains inorganic luster pigments.

27. The functional element as recited in claim 8, wherein the inorganic colored pigments, black pigments, and/or white pigments have a particle diameter of less than 10 μm.

28. The functional element as recited in claim 1, wherein when platelet-shaped luster pigments are used, they have an edge length of ≤75 μm.

29. The functional element as recited in claim 1, wherein a percentage of colored pigments and/or black pigments and/or white pigments in the crosslinked coating (2) is in a range from 24 to 36 wt. %.

30. The functional element as recited in claim 1, wherein the coating (2) and/or the covering layer (3) each contains platelet-shaped fillers.

31. The functional element as recited in claim 1, wherein a percentage of fillers in the crosslinked coating (2) lies in the range from >0 to 15 wt. %.

32. The functional element as recited in claim 1, wherein a softening point or a melting point of the material of the coating (2) is ≤60° C.

33. The functional element as recited in claim 1, wherein the covering layer (3) contains a solid lubricant including a graphite and/or a boron nitride.

34. The functional element as recited in claim 1, wherein the coating (2) and the covering layer (3) are produced from a same coating material.

35. The functional element as recited in claim 1, wherein a coating system of the coating (2) and the covering layer (3) and has a sheet resistance of $\geq 10^9$ Ω/cm².

36. The functional element as recited in claim 1, wherein the covering layer (3) is softer than the coating (2), and a combination of the harder coating (2) and the softer covering layer (3) provides scratch resistance during transport and installation of the functional element wherein the coating is opaque, and during consumer use of the functional element the covering layer crosslinks.

37. A functional element, in particular a cooktop or a control panel, having a flat substrate (1) of a glass or a glass ceramic, a coating (2) containing a crosslinked polysiloxane applied to the substrate (1), and a covering layer (3) of an uncrosslinked polysiloxane applied over the coating (2), wherein the coating material for the coating (2) contains hydroxy-functional phenylpolysiloxanes with a percentage of 2 to 5 wt. % hydroxy groups and a molecular weight of 1500 to 2000 g/mol.

38. The functional element as recited in claim 37, wherein the covering layer contains a silicone resin in a form of polysiloxanes with methyl or phenyl groups as organic radicals and hydroxy, alkoxy, or vinyl radicals as functional groups.

39. A functional element, in particular a cooktop or a control panel, having a flat substrate (1) of a glass or a glass ceramic comprising a scratch resistant coating, the scratch resistant coating including an opaque harder first layer (2) formed of a crosslinked polysiloxane on the substrate (1), and a softer second layer (3) formed of an uncrosslinked polysiloxane over the coating (2), wherein the first coating is impermeable to the second covering layer (3) and the second layer (3) is sufficiently soft to be penetrated by a scratching or scraping object, wherein the uncrosslinked polysiloxane of the second layer has methyl or phenyl groups as organic radicals and hydroxy, alkoxy, or vinyl radicals as functional groups.

40. A functional element, in particular a cooktop or a control panel, having a flat substrate (1) of a glass or a glass ceramic and a coating thereon that provides scratch resistance during transport and installation of the functional element, the coating including a first coating (2) containing a crosslinked polysiloxane applied to the substrate (1) and a second covering layer (3) containing an uncrosslinked polysiloxane applied over the coating (2), wherein the first coating is opaque and impermeable to the second covering layer (3), wherein the uncrosslinked polysiloxane of the second covering layer has methyl or phenyl groups as organic radicals and hydroxy, alkoxy, or vinyl radicals as functional groups.

41. The functional element as recited in claim 40, wherein the first coating has a greater hardness than the second covering layer.

42. The functional element as recited in claim 40, wherein a layer thickness of the first coating (2) and/or the second covering layer (3) lies in a range from 15 to 30 μm, and a total layer thickness, comprising a sum of the layer thickness of the first coating (2) and the second covering layer (3), is at least 20 μm.

* * * * *